(12) United States Patent
Woltring et al.

(10) Patent No.: US 12,281,956 B2
(45) Date of Patent: Apr. 22, 2025

(54) AUTOMATIC BALANCER

(71) Applicant: Tokyo Seimitsu Co., Ltd., Tokyo (JP)

(72) Inventors: Kelvin Woltring, Portland, OR (US);
William Kernan, Portland, OR (US);
Joseph Canfield, Portland, OR (US);
Jeremy Rose, Portland, OR (US)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 18/789,239

(22) Filed: Jul. 30, 2024

(65) Prior Publication Data

US 2024/0385067 A1 Nov. 21, 2024

Related U.S. Application Data

(63) Continuation of application No. PCT/JP2022/045623, filed on Dec. 12, 2022.

(Continued)

(51) Int. Cl.
*G01M 1/36* (2006.01)

(52) U.S. Cl.
CPC ..................................... *G01M 1/36* (2013.01)

(58) Field of Classification Search
CPC ............................................... G01M 1/36
See application file for complete search history.

(56) References Cited

U.S. PATENT DOCUMENTS 4,899,628 A 2/1990 Seichter et al.
5,688,160 A * 11/1997 Pozzetti ............... F16F 15/322
451/5

(Continued)

FOREIGN PATENT DOCUMENTS

CN 1038982 A 1/1990
CN 101158614 A 4/2008

(Continued)

OTHER PUBLICATIONS

International Preliminary Report on Patentability for PCT/JP2022/045623 (PCT/IPEA/409) dated Sep. 14, 2023.

(Continued)

*Primary Examiner* — Natalie Huls
(74) *Attorney, Agent, or Firm* — Birch, Stewart, Kolasch & Birch, LLP

(57) ABSTRACT

An automatic balancer comprising: a balance head configured to rotate integrally with a rotating body around a rotation axis of the rotating body, the balance head including a balance correction mechanism configured to correct imbalance of the rotating body, and a case having a cylindrical outer peripheral surface parallel to the rotation axis and configured to house the balance correction mechanism; a stator provided separately from the balance head and having a shape which is along a circumferential direction of the outer peripheral surface with a clearance from the outer peripheral surface; and a rotor part provided at a position where the rotor part faces the stator on the outer peripheral surface, configured to rotate integrally with the balance head, the rotor part having a shape along the circumferential direction of the outer peripheral surface, wherein the stator and the rotor part are configured to perform wireless communication therebetween.

4 Claims, 5 Drawing Sheets

Related U.S. Application Data

(60) Provisional application No. 63/304,971, filed on Jan. 31, 2022.

(56) References Cited

U.S. PATENT DOCUMENTS

| | | |
|---|---|---|
| 2006/0005623 A1 | 1/2006 | Hildebrand et al. |
| 2014/0094091 A1 | 4/2014 | Trionfetti |
| 2015/0290772 A1 | 10/2015 | Trionfetti |
| 2021/0379728 A1 | 12/2021 | Trionfetti |
| 2022/0161389 A1* | 5/2022 | Ruggeri ............... B24B 41/042 |

FOREIGN PATENT DOCUMENTS

| | | | | |
|---|---|---|---|---|
| CN | 104704338 A | | 6/2015 | |
| CN | 110470428 A | * | 11/2019 | |
| EP | 1870198 A1 | * | 12/2007 | ........... B23Q 1/0009 |
| EP | 3 869 173 A1 | | 8/2021 | |
| EP | 3 869 174 A1 | | 8/2021 | |
| IT | MI20 090 100 A1 | | 7/2010 | |
| IT | MI20 090 101 A1 | | 7/2010 | |
| JP | 3-19766 A | | 1/1991 | |
| JP | 8-508096 A | | 8/1996 | |
| JP | 2001-232563 A | | 8/2001 | |
| JP | 2011-95163 A | | 5/2011 | |
| JP | 2015-200650 A | | 11/2015 | |
| KR | 20080036933 A | * | 4/2008 | |
| WO | WO 94/21995 A1 | | 9/1994 | |
| WO | WO 96/17294 A1 | | 6/1996 | |

OTHER PUBLICATIONS

International Search Report for PCT/JP2022/045623 (PCT/ISA/210) mailed on Feb. 14, 2023.
Written Opinion of the International Searching Authority for PCT/JP2022/045623 (PCT/ISA/237) mailed on Feb. 14, 2023.
Korean Office Action for corresponding Korean Application No. 10-2024-7025378, dated Dec. 18, 2024, with an English translation.
Chinese Office Action and Search Report for corresponding Chinese Application No. 202280090424.4 dated Feb. 7, 2025, with an English translation.
Extended European Search Report for corresponding European Application No. 22924130.2, dated Mar. 10, 2025.

* cited by examiner

AUTOMATIC BALANCER

CROSS-REFERENCE TO RELATED APPLICATIONS

The present application is a Continuation of PCT International Application No. PCT/JP2022/045623 filed on Dec. 12, 2022 claiming priority under 35 U.S.C § 119(a) of U.S. Provisional Application 63/304,971 filed on Jan. 31, 2022. Each of the above applications is hereby expressly incorporated by reference, in their entirety, into the present application.

BACKGROUND OF THE INVENTION

Field of the Invention

The present invention relates to an automatic balancer which corrects imbalance of a rotating body.

Description of the Related Art

Conventionally, there is a grinding machine which performs grinding on a work to be machined using a disk-shaped grinding stone (rotating body) rotating at high speed. The grinding machine is provided with an automatic balancer which automatically corrects imbalance of the grinding stone during high speed rotation (see Patent Literature 1). The automatic balancer includes: a balance head which is coupled to the grinding stone and rotates integrally with the grinding stone; and a stator (also called "sender") which transmits drive power and drive command input from a controller, to the balance head. The balance head moves a plurality of balance weights in the balance head based on the drive power and the drive command input from the stator so as to correct imbalance of the grinding stone.

As a kind of automatic balancers, there is an automatic balancer including a non-contact type balance head and a stator (see "Patent Literature 2"). The stator disclosed in Patent Literature 2 includes a transmitter and a stator coil which can wirelessly transmit drive power and drive command. The grinding stone is coupled to the balance head on a back end surface side, and the stator is disposed so as to face a front end surface which is on an opposite side of the back end surface. In addition, a rotor is provided on the front end surface of the balance head disclosed in Patent Literature 2. The rotor includes a rotor coil and a receiving circuit for receiving the drive power and the drive command wirelessly transmitted from the stator. Thus, the drive power and the drive command can be wirelessly transmitted from the stator to the balance head without coupling the stator onto the balance head.

CITATION LIST

Patent Literature 1: Japanese Patent Application Laid-Open No. 2001-232563
Patent Literature 2: Japanese Patent Application Laid-Open No. 2011-095163

SUMMARY OF THE INVENTION

However, a conventional automatic balancer having a non-contact type balance head and a stator, is configured in such a manner that the balance head and the stator are arranged in series along an axial direction of a rotation axis around which a rotating body such as a grinding stone and so on is rotated. In other words, the balance head and the stator are arranged opposite to each other in such a manner that the balance head and the stator overlap each other in their thickness direction. As a result, because a length of the automatic balancer becomes long (thickness becomes thick) in the axial direction of the rotation axis, it is required to secure an installation space for the automatic balancer in the grinding machine. In addition, it is required to modify a case for housing the rotating body such as the grinding stone and so on in order to install the automatic balancer in the grinding machine.

The present invention has been made in view of the aforementioned circumstances, and aims to provide an automatic balancer having a shorter length than that in the conventional art in the axial direction of the rotation axis.

In order to achieve the aforementioned objective, an automatic balancer includes: a balance head configured to rotate integrally with a rotating body around a rotation axis of the rotating body, the balance head including a balance correction mechanism which is electric and configured to correct imbalance of the rotating body, and a case having a cylindrical outer peripheral surface parallel to the rotation axis and configured to house the balance correction mechanism; a stator provided separately from the balance head and having a shape which is along a circumferential direction of the outer peripheral surface with a clearance from the outer peripheral surface, the stator electrically connected to a controller of the balance head; and a rotor part provided at a position where the rotor part faces the stator on the outer peripheral surface and configured to rotate integrally with the balance head, the rotor part having a shape along the circumferential direction of the outer peripheral surface and electrically connected to the balance correction mechanism, wherein the stator and the rotor part are configured to perform wireless communication therebetween.

In the automatic balancer, the stator may be loosely fitted to the outer peripheral surface of the case of the balance head. Further, the rotor part may be provided on the outer peripheral surface of the case.

In the automatic balancer according to another aspect of the present invention, the stator is formed in a ring shape along the circumferential direction of the outer peripheral surface, and is loosely fitted to the outer peripheral surface. Thus, a length of the automatic balance may be made shorter in an axial direction of the rotation axis.

In the automatic balancer according to another aspect of the present invention, the rotor part is formed in a ring shape along the circumferential direction of the outer peripheral surface. Thus, wireless transmission may be performed between the stator and the rotor part.

In the automatic balancer according to another aspect of the present invention, the stator and the rotor part face each other in an axial direction of the rotation axis. Thus, wireless transmission may be performed between the stator and the rotor part.

In the automatic balancer according to another aspect of the present invention, the stator wirelessly transmits to the rotor part, drive power and drive command of the balance head input from the controller, the rotor part receives the drive power and the drive command from the stator, and the balance correction mechanism operates based on the drive power and the drive command received by the rotor part. Thus, the drive power and the drive command may be transmitted from the stator to the balance head in a non-contact manner.

The automatic balancer according to another aspect of the present invention, includes a detecting sensor provided to the case, and configured to detect contact of a contacting object with the rotating body, wherein the rotor part wirelessly transmits detection signal of the detecting sensor to the stator, and the stator outputs to the controller, the detection signal received from the rotor part. Thus, the detection signal may be transmitted from the balance head to the stator in a non-contact manner.

In the present invention, the length of the automatic balance may be made shorter in the axial direction of the rotation axis.

DESCRIPTION OF THE PREFERRED EMBODIMENTS

Figure 1:
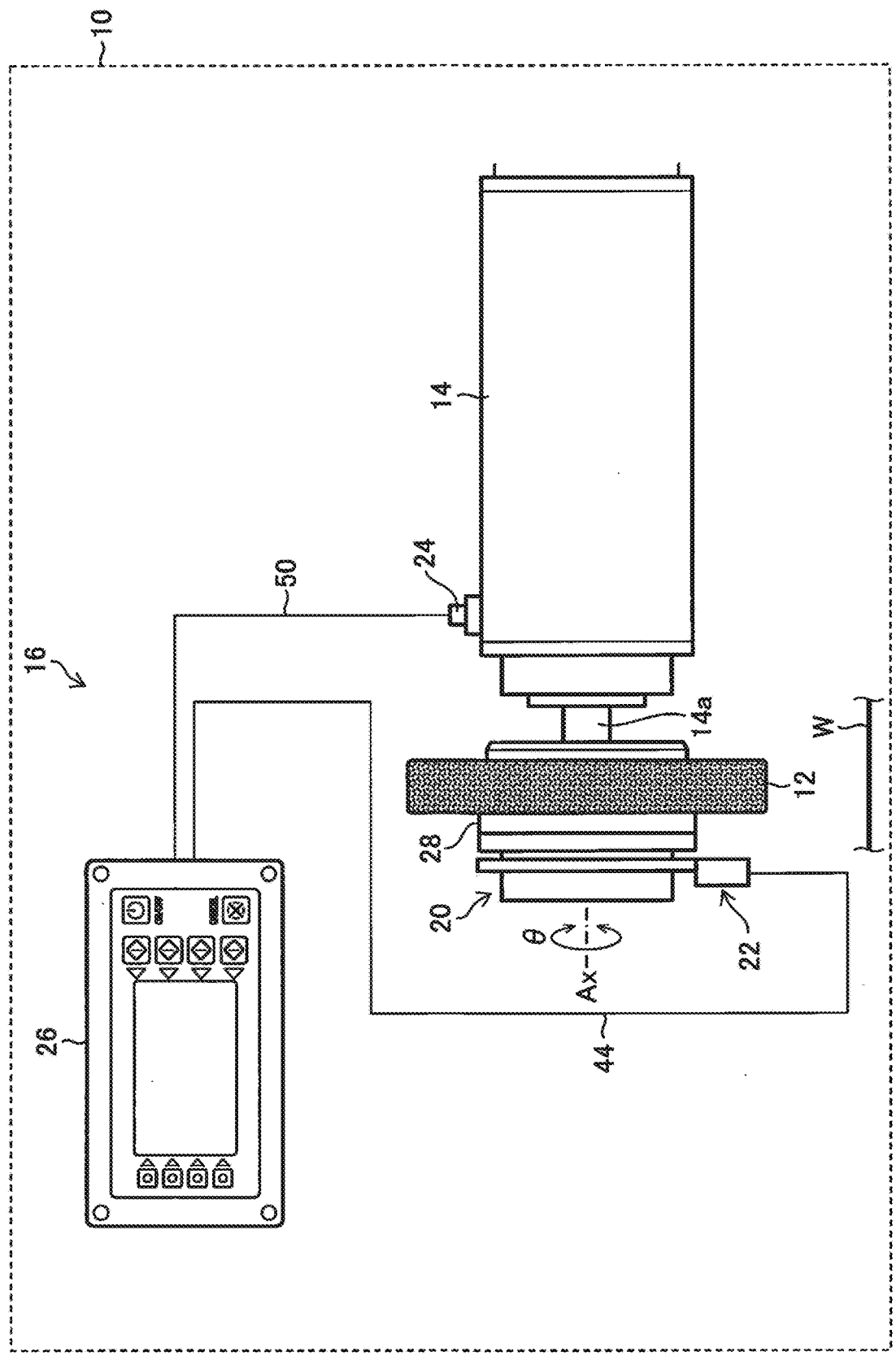
FIG. 1 is a schematic diagram illustrating an example in which an automatic balancer is applied to a grinding machine.

FIG. 1 is a schematic diagram illustrating an example in which an automatic balancer 16 according to the present invention is applied to a grinding machine 10. Here, only a main part is illustrated for the grinding machine 10.

The grinding machine 10 is used to, for example, perform grinding process on a work to be machined W. The grinding machine 10 includes a grinding stone 12, a spindle 14 and an automatic balancer 16, as shown in FIG. 1.

The grinding stone 12, which corresponds to a rotating body according to the present invention, is formed in a disk shape. The grinding stone 12 is held by the spindle 14 so as to be rotatable around a rotation axis 14a. Further, grinding stone 12 is coupled to a balance head 20 which is one of components of the automatic balancer 16, and rotates integrally with the balance head 20.

The spindle 14 includes a motor therein, and rotates the grinding stone 12 around the rotation axis 14a at high speed. Here, a reference sign Ax in the drawings denotes an axial direction of the rotation axis 14a. Further, a reference sign θ denotes a circumferential direction around the rotation axis 14a, that is, a rotation direction of the grinding stone 12 and the balance head 20.

The automatic balancer 16 automatically corrects imbalance of the grinding stone 12 rotating at high speed. The automatic balancer 16 includes: a non-contact type balance head 20 and a stator 22; a vibration sensor (accelerometer) 24; and a controller 26. Although not illustrated, the automatic balancer 16 may further include a detecting sensor which detects a rotation angle (see Patent Literature 2) of the balance head 20.

The balance head 20 is coupled to the grinding stone 12 via an adaptor flange 28. Thus, as written above, the grinding stone 12 and the balance head 20 integrally rotate in the circumferential direction θ. The balance head 20 is operated based on drive power and drive command input in a non-contact manner via the controller 26 and the stator 22, and corrects imbalance of the grinding stone 12 rotating at high speed.

Figure 2:
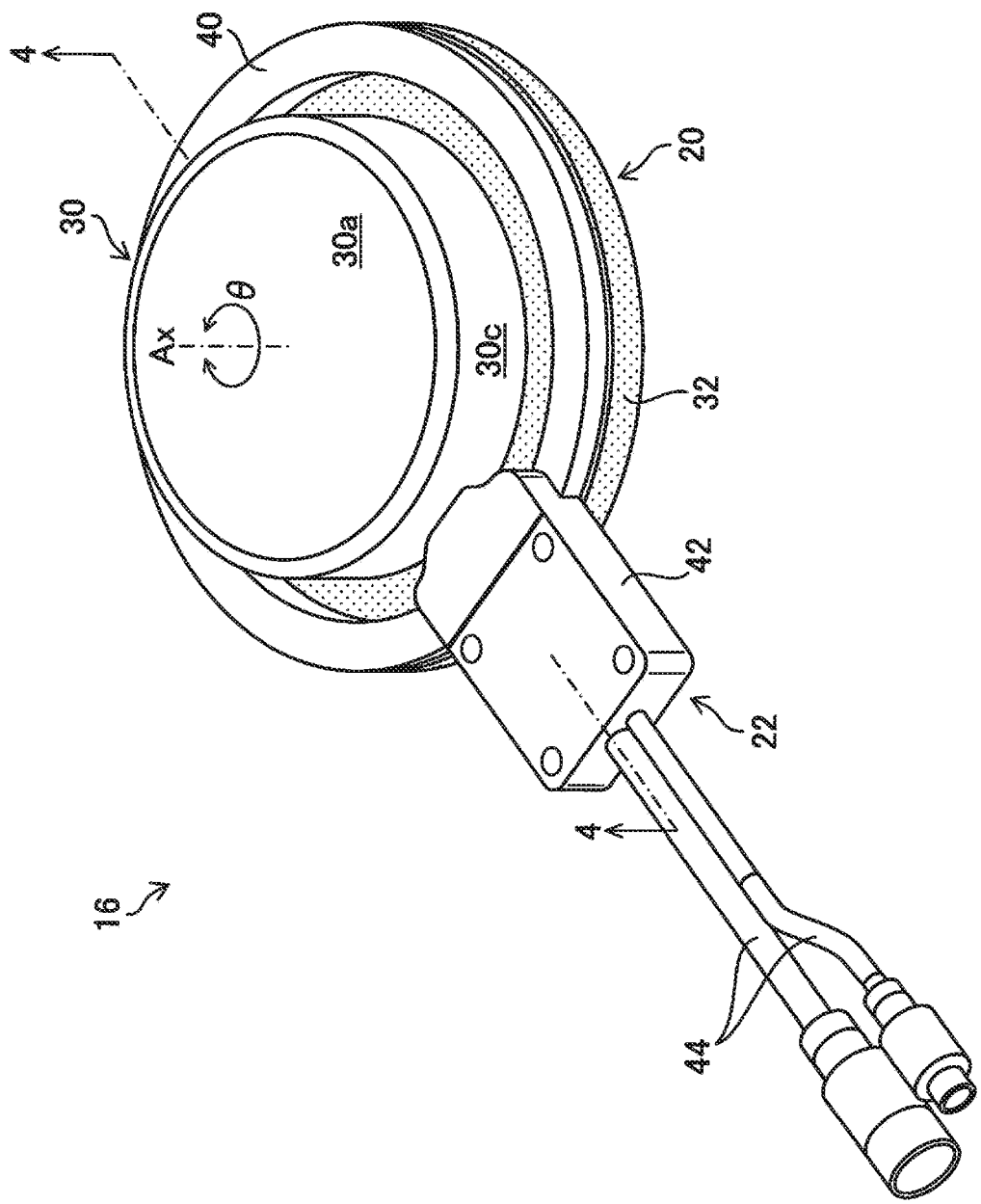
FIG. 2 is a perspective view of a non-contact type balance head and a stator.
Figure 3:
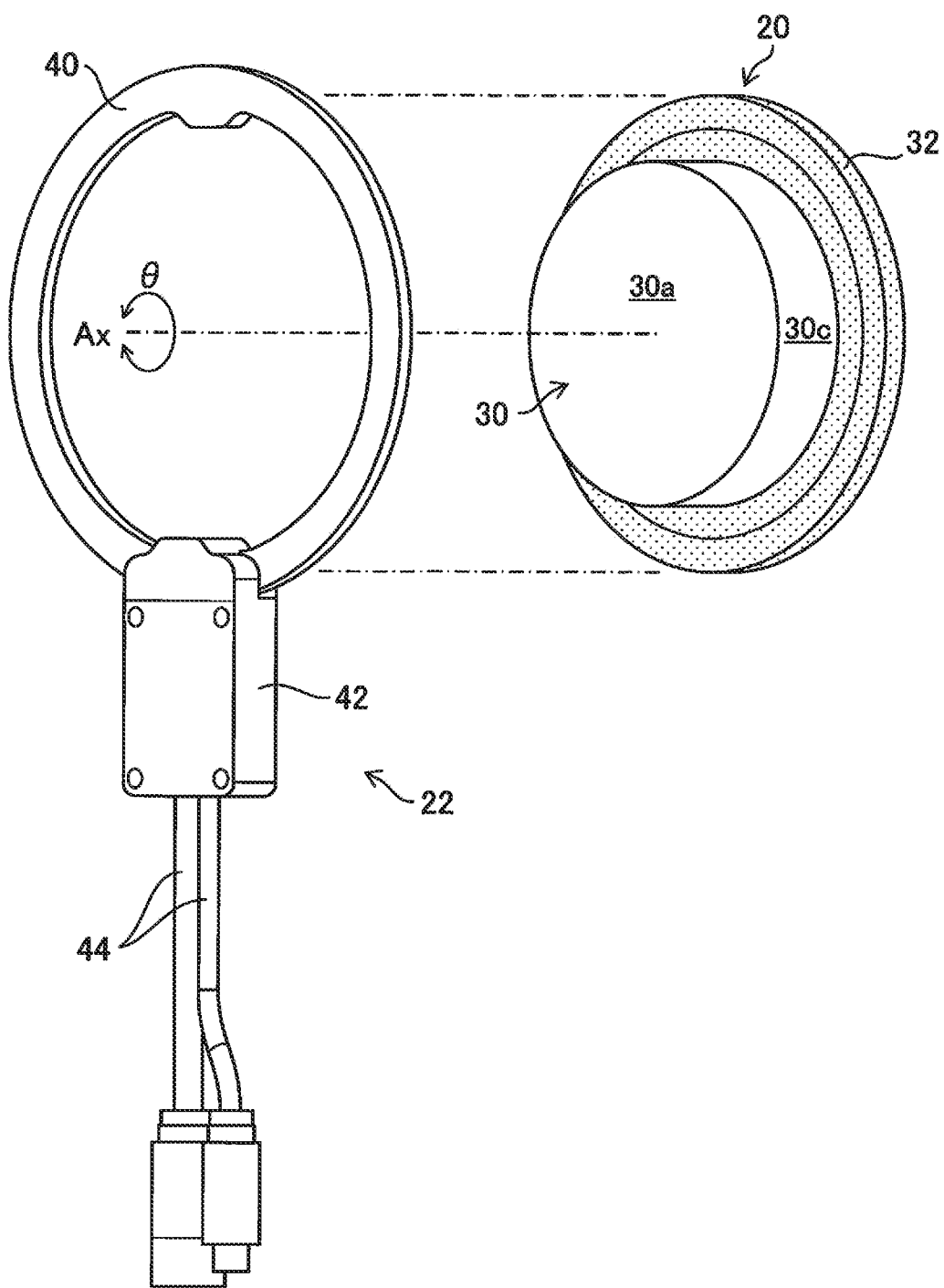
FIG. 3 is an exploded perspective view of the balance head and the stator illustrated in FIG. 2.
Figure 4:
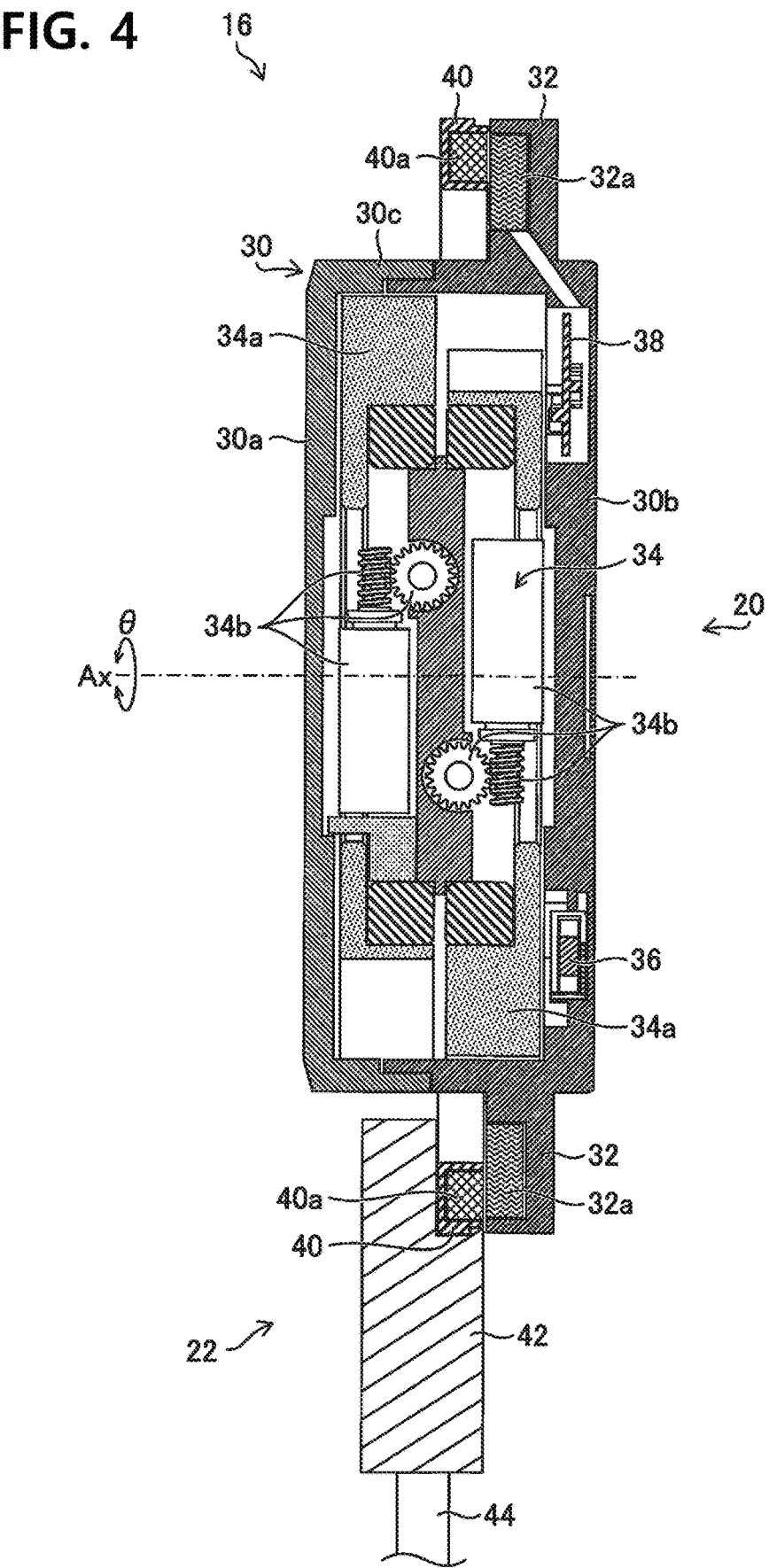
FIG. 4 is a cross-sectional view of the balance head and the stator illustrated in FIG. 2 along a line 4-4.

FIG. 2 is a perspective view of the non-contact type balance head 20 and the stator 22. FIG. 3 is an exploded perspective view of the balance head 20 and the stator 22 illustrated in FIG. 2. FIG. 4 is a cross-sectional view of the balance head 20 and the stator 22 illustrated in FIG. 2 along a line 4-4.

As shown in FIGS. 2 to 4, the balance head 20 includes: a case 30; a rotor part 32; a balance correction mechanism 34; an AE sensor 36; and a control board 38.

The case 30 is formed in a hollow cylindrical shape which is parallel to the axial direction Ax. The case 30 includes: a front end surface 30a and a rear end surface 30b; and an outer peripheral surface 30c. The front end surface 30a and the rear end surface 30b are spaced apart from each other in the axial direction Ax, and respectively have a disk-shape perpendicular to the axial direction Ax. The outer peripheral surface 30c connects a peripheral part of the front end surface 30a and a peripheral part of the rear end surface 30b. Further, the outer peripheral surface 30c is formed so as to be dividable into two parts in the axial direction Ax.

The electric balance correction mechanism 34 is housed inside the case 30. The control board 38 and the AE sensor 36 are provided inside a wall part forming the rear end surface 30b.

The balance correction mechanism 34 includes: two balance weights 34a; and two sets of motor drive mechanisms 34b. Each of the balance weights 34a is held by a corresponding motor drive mechanism 34b so as to be displaceable (movable) in the circumferential direction θ around the axial direction Ax. Each of the motor drive mechanisms 34b includes a motor and a plurality of gears, for example. Each of the motor drive mechanisms 34b receives energization from the control board 38 and moves each of the balance weights 34a independently from each other in the circumferential direction θ. Note that the balance correction mechanism 34 should not be limited to the one shown in the drawings. Various types of known balance correction mechanisms may be applied.

The AE sensor 36 is an acoustic emission sensor and corresponds to a detecting sensor of the present invention. The AE sensor 36 detects acoustic sound in high-frequency band generated when the grinding stone 12 comes into contact with, for example, the work to be machined W, a dresser, or other contacting objects, and outputs a detection signal of the acoustic sound to the control board 38.

The rotor part 32 is provided on the outer peripheral surface 30c, and rotates integrally with the balance head 20 in the circumferential direction θ. The rotor part 32 is formed into a shape which is along a circumferential direction (circumferential direction θ around the axial direction Ax) of the outer peripheral surface 30c. Specifically, the rotor part 32 is formed into a ring shape (flange shape). Inside the rotor part 32, a rotor coil 32a, which is a ring-shaped antenna coil, is provided. Note that, although the rotor part 32 is formed integrally with the case 30 in the present embodiment, the rotor part 32 may be formed separately from the case 30 and fixed to the case 30.

The rotor coil 32a is electrically connected to the control board 38. Further, the rotor coil 32a is electrically connected to the balance correction mechanism 34 and so on, via the control board 38. The rotor coil 32a receives drive power wirelessly transmitted (power transmission) from the stator 22 which is described later, and drive command of the balance correction mechanism 34 wirelessly transmitted (information transmission) also from the stator 22. Inversely, the rotor coil 32a wirelessly transmits (information transmission) the detection signal of the AE sensor 36 input from the control board 38, to the stator 22.

The control board 38 includes: a processor such as a CPU (Central Processing Unit) and the like; a power receiving circuit; a power transmitting circuit; a reception demodulating part; a transmission modulating part; and so on. The control board 38 converts the drive power (alternative current power) received by the rotor coil 32a to direct current power, and then, supplies the drive power to the balance correction mechanism 34, the AE sensor 36 and so on. Further, the control board 38 outputs the drive command received by the rotor coil 32a, to the balance correction mechanism 34. In addition, the balance correction mechanism 34 controls energization to the rotor coil 32a so that the detection signal of the AE sensor 36 is wirelessly transmitted from the rotor coil 32a to the stator 22.

The stator 22 is provided separately from the balance head 20. The stator 22 functions as a sender which wirelessly transmits the drive power and the drive command of the balance head 20 output from the controller 26. Inversely, the stator 22 also functions as a receiver which receives the detection signal of the AE sensor 36 wirelessly transmitted from the rotor part 32 and outputs the detection signal to the controller 26. The stator 22 includes: a stator ring 40; a transmission/reception control part 42; and a signal cable 44.

The stator ring 40 is formed in a ring shape which is along the circumferential direction of the outer peripheral surface 30c. Specifically, the stator ring 40 is formed to have an inner diameter larger than an outer diameter of the outer peripheral surface 30c, and is loosely fitted with the outer peripheral surface 30c (that is, the stator ring 40 is fitted on the outer peripheral surface 30c with a clearance from the outer peripheral surface 30c). In other words, the case 30 is inserted into a space surrounded by the stator ring 40. Further, the stator ring 40 is attached to a not-shown fixing part (for example, a machine guard) of the grinding machine 10 provided in a vicinity of the grinding stone 12, thereby fixing the stator ring 40 at a position where the stator ring 40 faces the rotor part 32 in the axial direction Ax, and is in a vicinity of the rotor part 32. Therefore, wireless transmission may be performed between the balance head 20 and the rotor part 32. Inside the stator ring 40, a stator coil 40a which is a ring-shaped antenna coil, is provided.

The stator coil 40a performs wireless transmission of the drive power, the drive command, the detection signal and so on between the stator coil 40a and the rotor coil 32a, under control of the transmission/reception control part 42 which is described later.

The transmission/reception control part 42 includes a transmission modulating part (transmitter), a reception demodulating part and so on. The transmission/reception control part 42 is electrically connected to the controller 26 via the signal cable 44, and also electrically connected to the stator coil 40a.

The transmission/reception control part 42 controls energization to the stator coil 40a based on the drive power input from the controller 26, thereby wirelessly transmitting the drive power to the rotor coil 32a using a known system such as an electromagnetic induction system, a magnetic field resonance system, an electric field resonance system and so on. Further, the transmission/reception control part 42 controls energization to the stator coil 40a based on the drive command of the balance head 20 input from the controller 26, thereby wirelessly transmitting the drive command using a known system. Therefore, the drive power and the drive command may be transmitted from the stator 22 to the balance head 20 in a non-contact manner.

In addition, the transmission/reception control part 42 outputs to the controller 26, the detection signal of the AE sensor 36 which is transmitted from the rotor coil 32a to the stator coil 40a in a non-contact manner.

Returning to FIG. 1, the vibration sensor 24 is attached to the spindle 14. Further, the vibration sensor 24 is connected to the controller 26 via a signal cable 50. The vibration sensor 24 detects low-frequency vibration emitted from the spindle 14 due to imbalance of the grinding stone 12 rotated at high speed by the spindle 14, and outputs the vibration detection signal to the controller 26.

The controller 26 integrally controls supply of the drive power to the balance head 20, drive of the balance head 20 and vibration detection by the vibration sensor 24.

While the rotation drive of the grinding stone 12 is performed by the spindle 14, the controller 26 outputs the drive power of the balance head 20 to the transmission/reception control part 42. While the drive power is input from the controller 26, the transmission/reception control part 42 controls energization to the stator coil 40a, and performs wireless transmission of the drive power from the stator coil 40a to the rotor coil 32a. The drive power received by the rotor coil 32a is supplied to respective parts of the balance head 20 via the control board 38. As a result, the balance head 20 and the AE sensor 36 are in an operating state.

Next, the AE sensor 36 starts detection of acoustic sound and continuously outputs a detection signal of the acoustic sound (acoustic sound detection signal) to the control board 38. While the acoustic sound detection signal is input from the AE sensor 36, the control board 38 controls energization to the rotor coil 32a based on the acoustic sound detection signal, thereby wirelessly transmitting the acoustic sound detection signal from the rotor coil 32a to the stator coil 40a. The acoustic sound detection signal received by the stator coil 40a is output to the controller 26 by the transmission/reception control part 42. Thus, the controller 26 may detect that the grinding stone 12 comes into contact with the work to be machined W based on the acoustic sound detection signal.

In addition, while the rotation drive of the grinding stone 12 is performed by the spindle 14, the controller 26 causes the vibration sensor 24 to operate. Thus, a vibration detection signal is continuously input from the vibration sensor 24 to the controller 26. Each time when the vibration detection signal is input from the vibration sensor 24, the controller 26 determines arrangement of the respective balance weights 34a in the balance correction mechanism 34 using a known method in such a manner that the arrangement may correct imbalance of the grinding stone 12.

Next, each time when the arrangement of the respective balance weights 34a is determined, the controller 26 generates drive command for driving the balance correction mechanism 34 and outputs the drive command to the transmission/reception control part 42. Then, each time when the drive command is input from the controller 26, the transmission/reception control part 42 controls energization to the stator coil 40a, and performs wireless transmission of the drive command from the stator coil 40a to the rotor coil 32a. The drive command received by the rotor coil 32a is input to the balance correction mechanism 34 via the control board 38. As a result, the balance correction mechanism 34 is driven according to the drive command so as to correct imbalance of the grinding stone 12 rotating at high speed.

Figure 5:
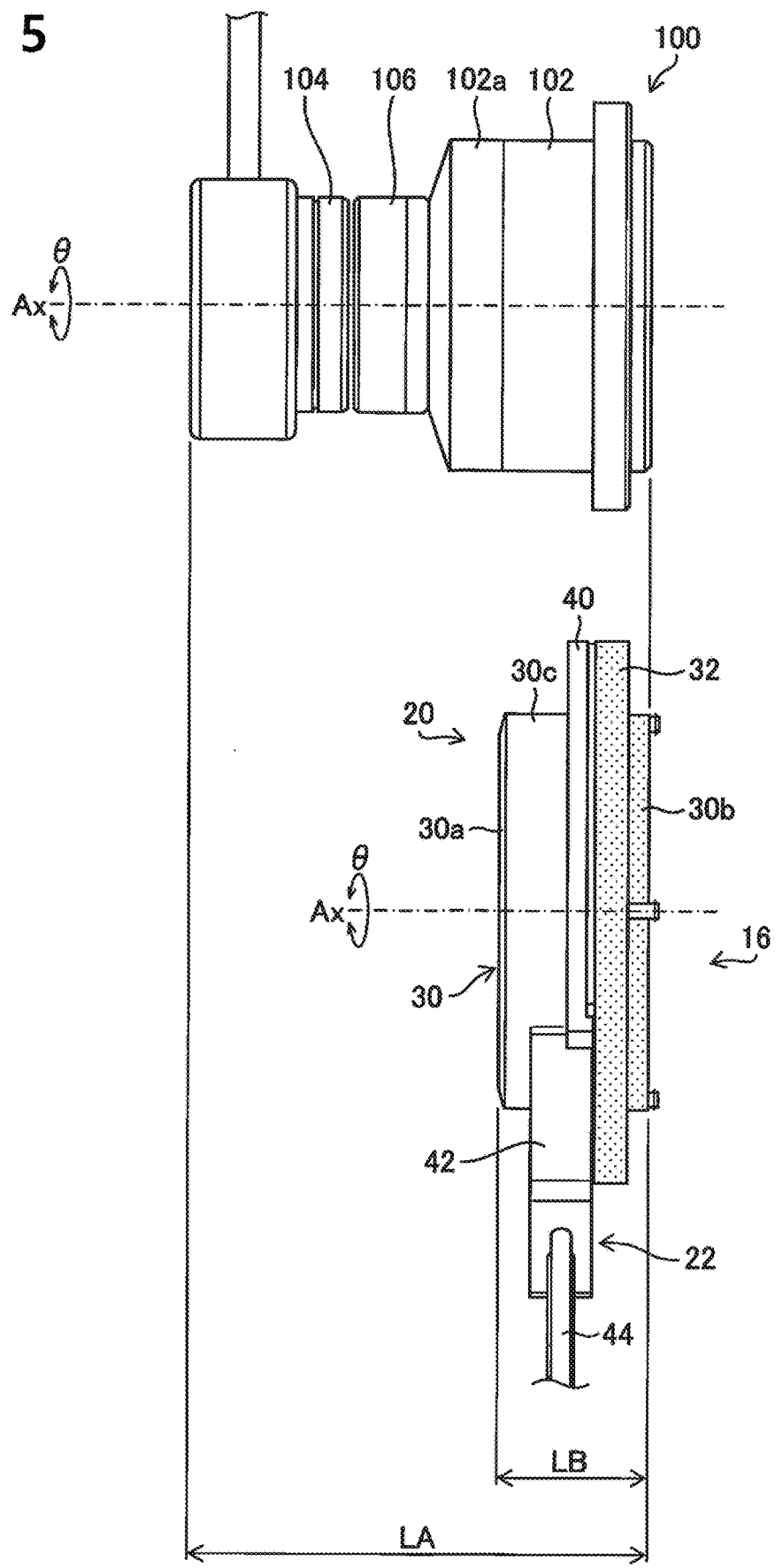
FIG. 5 is an explanatory diagram for explaining an advantageous effect of the automatic balancer according to the present embodiment, compared to an automatic balancer according to an comparative example.

FIG. 5 is an explanatory diagram for explaining an advantageous effect of the automatic balancer 16 according to the present embodiment, compared to an automatic balancer 100 according to an comparative example. As shown in FIG. 5, the automatic balancer 100 includes a balance head 102 and a stator 104, and a rotor 106 is provided on a front end surface of the balance head 102 via an adaptor 102a. Further, the stator 104 is arranged at a position facing the rotor 106. As a result, a length LA of the automatic balancer 100 becomes long because the balance head 102, the adaptor 102a, the rotor 106 and the stator 104 are arranged in series along the axial direction Ax.

Contrary, the automatic balancer 16 according to the present embodiment has a ring-shaped stator ring 40 in the stator 22, and the stator ring 40 is loosely fitted to the outer peripheral surface 30c of the balance head 20. Therefore, in the automatic balancer 16 according to the present embodiment, the rotor part 32 may be formed on the outer peripheral surface 30c, and the adaptor 102a in the comparative example becomes unnecessary. As a result, the length LB of whole of the automatic balancer 16 along the axial direction Ax becomes equal to a length of only the balance head 20 along the axial direction Ax. Thus, the length LB in the present embodiment becomes much shorter than the length LA in the comparative example along the axial direction Ax, thereby reducing a space for installing the automatic balancer 16 in the grinding machine 10. In addition, there is no need to modify a case for housing the grinding stone 12 in order to install the automatic balancer 16 in the grinding machine 10.

In the present embodiment, the outer peripheral surface 30c of the case 30 is formed in a circular cylindrical shape. However, as long as the case 30 is rotatable in the circumferential direction θ around the rotation axis in a space surrounded by the stator ring 40, the outer peripheral surface 30c may have any cylindrical shape other than a circular cylindrical shape. Further, although the rotor part 32 (rotor coil 32a) and the stator ring 40 (stator coil 40a) are respectively formed in a circular ring shape in the present embodiment, they may be formed in any shapes such as a rectangular ring shape (polygonal ring shape) and so on, as long as wireless transmission may be performed between the rotor coil 32a and the stator coil 40a.

In the present embodiment, the rotor part 32 and the stator ring 40 are respectively formed in a ring shape. However, the shape of the rotor part 32 and the stator ring 40 is not limited to a ring shape as long as the shape of the rotor part 32 and the stator ring 40 is along the circumferential direction (circumferential direction θ around the rotation axis) of the outer peripheral surface 30c. For example, the rotor part 32 and the stator ring 40 may be formed in a circular arc shape or a semiring shape. Note that, either one of the rotor part 32 and the stator ring 40 is preferably formed in a ring shape in order to constantly perform wireless communication of the drive power and so on between the rotor part 32 and the stator ring 40.

In the present embodiment, the rotor part 32 is provided at a position where the rotor part 32 faces the stator ring 40 in the axial direction Ax and is on the outer peripheral surface 30c. However, the position of the rotor part 32 is not limited to that position. For example, the rotor part 32 may be provided at a position where the rotor part 32 faces an inner circumferential surface of the stator ring 40 and is on the outer peripheral surface 30c, that is, in a range surrounded by the stator ring 40 in the outer peripheral surface 30c.

Although the description is made for the automatic balancer 16 which corrects imbalance of the grinding stone 12 of the grinding machine 10, the present invention may be applied to an automatic balancer used for correcting imbalance of various types of rotating bodies provided in a semiconductor manufacturing apparatus other than the grinding machine 10. Further, the present invention may be applied in a case where imbalance of various types of rotating bodies in a technical field other than a semiconductor manufacturing apparatus.

REFERENCE SIGNS LIST

10 . . . grinding machine
12 . . . grinding stone
14 . . . spindle
14a . . . rotation axis
16 . . . automatic balancer
20 . . . balance head
22 . . . stator
24 . . . vibration sensor
26 . . . controller
28 . . . adaptor flange
30 . . . case
30a . . . front end surface
30b . . . rear end surface
30c . . . outer peripheral surface
32 . . . rotor part
32a . . . rotor coil
34 . . . balance correction mechanism
34a . . . balance weights
34b . . . motor drive mechanisms
36. . . . AE sensor
38 . . . control board
40 . . . the stator ring
40a . . . stator coil
42 . . . transmission/reception control part
44, 50 . . . signal cable
100 . . . automatic balancer
102 . . . balance head
102a . . . adaptor
104 . . . stator
106 . . . rotor
Ax . . . axial direction
θ . . . circumferential direction around a rotation axis
W . . . work to be machined

What is claimed is:
1. An automatic balancer comprising:
a balance head configured to rotate integrally with a rotating body around a rotation axis of the rotating body, the balance head including a balance correction mechanism which is electric and configured to correct imbalance of the rotating body, and a case having a cylindrical outer peripheral surface parallel to the rotation axis and configured to house the balance correction mechanism;
a stator provided separately from the balance head and having a shape which is along a circumferential direction of the outer peripheral surface with a clearance from the outer peripheral surface, the stator electrically connected to a controller of the balance head; and
a rotor part provided at a position where the rotor part faces the stator on the outer peripheral surface and configured to rotate integrally with the balance head, the rotor part having a shape along the circumferential direction of the outer peripheral surface and electrically connected to the balance correction mechanism, wherein the stator and the rotor part are configured to perform wireless communication therebetween, and the stator and the rotor part face each other in an axial direction of the rotation axis, wherein the stator is formed in a ring shape along the circumferential direction of the outer peripheral surface, and is loosely fitted to the outer peripheral surface.

2. The automatic balancer according to claim 1, wherein the rotor part is formed in a ring shape along the circumferential direction of the outer peripheral surface.

3. The automatic balancer according to claim 1, wherein
the stator wirelessly transmits to the rotor part, drive power and drive command of the balance head input from the controller, the rotor part receives the drive power and the drive command from the stator, and the balance correction mechanism operates based on the drive power and the drive command received by the rotor part.

4. The automatic balancer according to claim 1, comprising
a detecting sensor provided to the case, and configured to detect contact of a contacting object with the rotating body, wherein the rotor part wirelessly transmits detection signal of the detecting sensor to the stator, and the stator outputs to the controller, the detection signal received from the rotor part.

* * * * *